(12) United States Patent
Scott et al.

(10) Patent No.: US 8,231,010 B2
(45) Date of Patent: Jul. 31, 2012

(54) SCREEN ASSEMBLIES AND VIBRATORY SEPARATORS

(75) Inventors: Eric L. Scott, Conroe, TX (US); Gary S. Strong, Huntsville, TX (US)

(73) Assignee: Varco I/P, Inc., Houston, TX (US)

( * ) Notice: Subject to any disclaimer, the term of this patent is extended or adjusted under 35 U.S.C. 154(b) by 947 days.

(21) Appl. No.: 11/637,615

(22) Filed: Dec. 12, 2006

(65) Prior Publication Data

US 2008/0135463 A1    Jun. 12, 2008

(51) Int. Cl.
*B07B 1/49* (2006.01)
(52) U.S. Cl. .................................. 209/397; 209/408
(58) Field of Classification Search .............. 209/363, 209/397, 399, 405, 408
See application file for complete search history.

(56) References Cited

U.S. PATENT DOCUMENTS

| | | | |
|---|---|---|---|
| 2,082,513 A | 6/1937 | Roberts | 210/76 |
| 2,112,784 A | 3/1938 | McNitt | 99/105 |
| 2,418,529 A | 4/1947 | Stern | 51/309 |
| 3,012,674 A | 12/1961 | Hoppe | 209/401 |
| 3,302,720 A | 2/1967 | Brandon | 166/42 |
| 3,640,344 A | 2/1972 | Brandon | 166/307 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,893,488 A | 7/1975 | Rogers et al. | 138/141 |
| 3,893,525 A | 7/1975 | Dower et al. | 175/24 |
| 3,900,393 A * | 8/1975 | Wilson | 209/399 |
| 3,928,189 A | 12/1975 | Lower et al. | 209/405 |
| 3,993,146 A | 11/1976 | Poundstone et al. | 175/206 |
| 4,033,865 A | 7/1977 | Derrick, Jr. | 209/275 |
| 4,038,152 A | 7/1977 | Atkins | 201/2.5 |
| 4,115,507 A | 9/1978 | Pico et al. | 264/267 |
| 4,222,988 A | 9/1980 | Barthel | 422/309 |
| 4,233,181 A | 11/1980 | Goller et al. | 252/425.3 |
| 4,411,074 A | 10/1983 | Daly | 34/32 |
| 4,482,459 A | 11/1984 | Shiver | 210/639 |
| 4,526,687 A | 7/1985 | Nugent | 210/202 |
| 4,575,336 A | 3/1986 | Mudd et al. | 432/72 |
| 4,624,417 A | 11/1986 | Gangi | 241/17 |

(Continued)

FOREIGN PATENT DOCUMENTS

DE    4127929 A1    2/1993

(Continued)

OTHER PUBLICATIONS

Polyamide 6/6—Nylon 6/6—PA 6/6 60% Glass Fibre Reinforced. Datasheet [online]. AZoM™—The A to Z of Materials and AZojomo—The "AZo Journal of Materials Online", 2005 [retrieved on Nov. 23, 2005]. Retrieved from the Internet: <URL: http://web.archive.org/web/20051123025735/http://www.azom.com/details.asp?ArticleID=493>.*

(Continued)

*Primary Examiner* — Joseph C Rodriguez
*Assistant Examiner* — Kalyanavenkateshware Kumar
(74) *Attorney, Agent, or Firm* — Williams, Morgan & Amerson, P.C.

(57) ABSTRACT

A screen assembly having a support, the support made of composite material, and at least one layer of screening material on the support, the support having openings that are larger at the top than at the bottom (or vice versa) and/or with a base member or member extending across the bottom of the support.

24 Claims, 11 Drawing Sheets

U.S. PATENT DOCUMENTS

| | | | |
|---|---|---|---|
| 4,650,687 A | 3/1987 | Willard et al. | 426/438 |
| 4,696,353 A | 9/1987 | Elmquist et al. | 175/206 |
| 4,696,751 A | 9/1987 | Eifling | 210/780 |
| 4,728,422 A | 3/1988 | Bailey | 210/314 |
| 4,729,548 A | 3/1988 | Sullins | 266/44 |
| 4,735,712 A | 4/1988 | Herren et al. | 209/403 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,799,987 A | 1/1989 | Sullins | 156/425 |
| 4,809,791 A | 3/1989 | Hayatdavoudi | 175/40 |
| 4,832,853 A | 5/1989 | Shiraki et al. | 210/781 |
| 4,889,733 A | 12/1989 | Willard et al. | 426/438 |
| 4,889,737 A | 12/1989 | Willard et al. | 426/550 |
| 4,895,665 A | 1/1990 | Colelli et al. | 210/710 |
| 4,895,731 A | 1/1990 | Baker et al. | 426/641 |
| 4,896,835 A | 1/1990 | Fahrenholz | 241/74 |
| 4,915,452 A | 4/1990 | Dibble | 299/17 |
| 4,942,929 A | 7/1990 | Malachosky et al. | 175/66 |
| 5,006,228 A | 4/1991 | Anderson et al. | 209/365.3 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,129,469 A | 7/1992 | Jackson | 175/66 |
| 5,145,256 A | 9/1992 | Wiemers et al. | 366/336 |
| 5,181,578 A | 1/1993 | Lawler | 175/424 |
| 5,190,645 A | 3/1993 | Burgess | 210/144 |
| 5,200,372 A | 4/1993 | Kuroyama et al. | 501/96 |
| 5,221,008 A | 6/1993 | Derrick, Jr. et al. | 209/269 |
| 5,227,057 A | 7/1993 | Lundquist | 210/174 |
| 5,253,718 A | 10/1993 | Lawler | 175/20 |
| 5,314,058 A | 5/1994 | Graham | 198/753 |
| 5,337,966 A | 8/1994 | Francis et al. | 241/46.06 |
| 5,385,669 A | 1/1995 | Leone | 210/488 |
| 5,488,104 A | 1/1996 | Schulz | 536/86 |
| 5,489,204 A | 2/1996 | Conwell et al. | 432/153 |
| 5,516,348 A | 5/1996 | Conwell et al. | 51/309 |
| 5,534,207 A | 7/1996 | Burrus | 264/150 |
| 5,536,264 A | 7/1996 | Hsueh et al. | 604/368 |
| 5,547,479 A | 8/1996 | Conwell et al. | 51/309 |
| 5,551,575 A | 9/1996 | Leone | 209/273 |
| 5,566,889 A | 10/1996 | Preiss | 241/19 |
| 5,566,919 A | 10/1996 | Shephard | 248/604 |
| 5,567,150 A | 10/1996 | Conwell et al. | 432/14 |
| 5,570,749 A | 11/1996 | Reed | 175/66 |
| 5,638,960 A * | 6/1997 | Beuermann et al. | 209/397 |
| 5,669,941 A | 9/1997 | Peterson | 51/295 |
| 5,685,982 A | 11/1997 | Foster | 210/385 |
| 5,699,918 A | 12/1997 | Dunn | 209/397 |
| 5,732,828 A | 3/1998 | Littlefield, Jr. | 209/365.1 |
| 5,791,494 A | 8/1998 | Meyer | 209/368 |
| 5,819,952 A | 10/1998 | Cook et al. | 209/400 |
| 5,851,686 A | 12/1998 | Aghajanian et al. | 428/614 |
| 5,855,955 A | 1/1999 | Claar et al. | 427/248.1 |
| 5,868,125 A | 2/1999 | Maoujoud | 125/15 |
| 5,896,998 A | 4/1999 | Bjorklund et al. | 209/326 |
| 5,924,261 A | 7/1999 | Fricke | 52/720.1 |
| 5,938,936 A | 8/1999 | Hodges et al. | 210/705 |
| 5,944,197 A | 8/1999 | Baltzer et al. | 209/400 |
| 5,971,307 A | 10/1999 | Davenport | 241/259.1 |
| 6,013,158 A | 1/2000 | Wootten | 202/99 |
| 6,019,228 A | 2/2000 | Duggan | 209/408 |
| 6,045,070 A | 4/2000 | Davenport | 241/60 |
| 6,102,310 A | 8/2000 | Davenport | 241/21 |
| 6,138,834 A | 10/2000 | Southall | 209/17 |
| 6,152,307 A | 11/2000 | Adams et al. | 209/403 |
| 6,155,428 A | 12/2000 | Bailey et al. | 209/315 |
| 6,165,323 A * | 12/2000 | Shearer | 162/251 |
| 6,170,580 B1 | 1/2001 | Reddoch | 175/66 |
| 6,186,337 B1 | 2/2001 | Adams et al. | 209/401 |
| 6,194,481 B1 | 2/2001 | Furman et al. | 522/77 |
| 6,223,906 B1 | 5/2001 | Williams | 210/400 |
| 6,234,250 B1 | 5/2001 | Green et al. | 166/250.03 |
| 6,241,098 B1 | 6/2001 | Schulte et al. | 209/401 |
| 6,267,247 B1 | 7/2001 | Seyffert et al. | 1/403 |
| 6,269,953 B1 | 8/2001 | Seyffert et al. | 209/399 |
| 6,279,471 B1 | 8/2001 | Reddoch | 100/37 |
| 6,283,302 B1 | 9/2001 | Schulte et al. | 209/399 |
| 6,290,068 B1 | 9/2001 | Adams et al. | 209/401 |
| 6,302,276 B1 | 10/2001 | Seyffert et al. | 209/412 |
| 6,324,833 B1 | 12/2001 | Singer et al. | 60/271 |
| 6,325,216 B1 | 12/2001 | Seyffert et al. | 209/408 |
| 6,331,028 B1 | 12/2001 | O'Neill et al. | 296/100 |
| 6,333,700 B1 | 12/2001 | Thomeer et al. | 340/854.8 |
| 6,339,047 B1 | 1/2002 | Christopherson et al. | 505/410 |
| 6,346,319 B1 | 2/2002 | Cochran | 428/295.1 |
| 6,346,325 B1 | 2/2002 | Edwards et al. | 428/401 |
| 6,352,779 B1 | 3/2002 | Edwards et al. | 428/412 |
| 6,353,038 B1 | 3/2002 | Aho et al. | 523/105 |
| 6,355,206 B1 | 3/2002 | Hanzawa et al. | 266/239 |
| 6,355,358 B1 | 3/2002 | Boer et al. | 428/474.4 |
| 6,358,603 B1 | 3/2002 | Bache | 428/323 |
| 6,361,860 B1 | 3/2002 | Koch | 428/364 |
| 6,371,302 B1 | 4/2002 | Adams et al. | 209/412 |
| 6,413,478 B1 | 7/2002 | Mabry et al. | 422/187 |
| 6,506,310 B2 | 1/2003 | Kulbeth | 210/780 |
| 6,581,781 B1 | 6/2003 | Adams et al. | 209/403 |
| 6,722,504 B2 | 4/2004 | Murray et al. | 209/359 |
| 6,763,605 B2 | 7/2004 | Reddoch | 34/58 |
| 6,783,088 B1 | 8/2004 | Gillis et al. | 241/19 |
| 6,793,814 B2 | 9/2004 | Fout et al. | 210/188 |
| 7,090,083 B2 | 8/2006 | Russell et al. | 209/405 |
| 7,175,028 B2 | 2/2007 | Colgrove et al. | 209/409 |
| 7,195,084 B2 | 3/2007 | Burnett et al. | 175/66 |
| 7,284,665 B2 | 10/2007 | Fuchs | 209/270 |
| 7,303,079 B2 | 12/2007 | Reid-Robertson et al. | 209/405 |
| 7,316,321 B2 | 1/2008 | Robertson et al. | 209/400 |
| 7,373,996 B1 | 5/2008 | Martin et al. | 175/206 |
| 7,514,011 B2 | 4/2009 | Kulbeth | 210/780 |
| 7,581,569 B2 | 9/2009 | Beck | 139/425 R |
| 7,770,665 B2 | 8/2010 | Eia et al. | 175/66 |
| 2001/0032815 A1 | 10/2001 | Adams et al. | 210/388 |
| 2002/0000399 A1* | 1/2002 | Winkler et al. | 209/399 |
| 2002/0033278 A1 | 3/2002 | Reddoch | 175/57 |
| 2002/0033358 A1 | 3/2002 | Bakula | 209/331 |
| 2002/0134709 A1 | 9/2002 | Riddle | 209/238 |
| 2003/0201237 A1 | 10/2003 | Grichar et al. | 210/785 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0103689 A1 | 5/2005 | Schulte, Jr. et al. | 209/405 |
| 2005/0236305 A1* | 10/2005 | Schulte et al. | 209/403 |
| 2006/0034988 A1 | 2/2006 | Bresnahan et al. | 426/502 |
| 2008/0078704 A1* | 4/2008 | Carr et al. | 209/399 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0119570 A1 | 5/2010 | Potter et al. | 424/422 |

FOREIGN PATENT DOCUMENTS

| | | |
|---|---|---|
| FR | 2 611 559 | 9/1988 |
| FR | 2 636 669 | 3/1990 |
| GB | 1 526 663 | 9/1978 |
| GB | 2 030 482 A | 4/1980 |
| GB | 2 206501 | 7/1987 |
| GB | 2 327 442 A | 1/1999 |
| GB | 2 413097 | 8/2004 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |

| | | |
|---|---|---|
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| WO | WO 97/03765 | 2/1997 |
| WO | WO 97/28906 | 8/1997 |
| WO | WO98/10895 | 3/1998 |
| WO | WO 01/76719 | 10/2001 |
| WO | WO 01/97947 | 12/2001 |

OTHER PUBLICATIONS

TK Liner System, Tuboscope, Feb. 2001.
TK 33 Liner System, Tuboscope. Feb. 2001.
TK 34 Liner System, Tuboscope, Feb. 2001.
TK 34 XT Liner System, Tuboscope, Feb. 2001.
TK 70 Liner System, Tuboscope, Feb. 2001.
TK 99 Liner System, Tuboscope, Feb. 2001.
Our coating services enhance your tubulars' performance and your bottom line, Tuboscope, 2002.
U.S. Appl. No. 12/481,959 Final Office Action dated Oct. 27, 2010.
U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/227,462 Office Action dated Nov. 15, 2010.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Jul. 21, 2010.
U.S. Appl. No. 11/897,975 Office Action dated Feb. 19, 2010.
EP Application No. 07 733 775.6 EPC Communication (Dec. 9, 2010).
Roblon, Roblon Als. 2001.
TK Liner System. Tuboscope. Feb. 2001.
TK 21 Liner System, Tuboscope. Feb. 2001.
TK 33 Liner System, Tuboscope, Feb. 2001.
TK 34 Liner System. Tuboscope, Feb. 2001.
TK 34 XT Liner System, Tuboscope. Feb. 2001.
TK 69 Liner System, Tuboscope. Feb. 2001.
TK 70 Liner System, Tuboscope. Feb. 2001.
TK 99 Liner System. Tuboscope. Feb. 2001.
Our coating services enhance your tubulars' performance and your bottom line. Tuboscope. 2002.

* cited by examiner

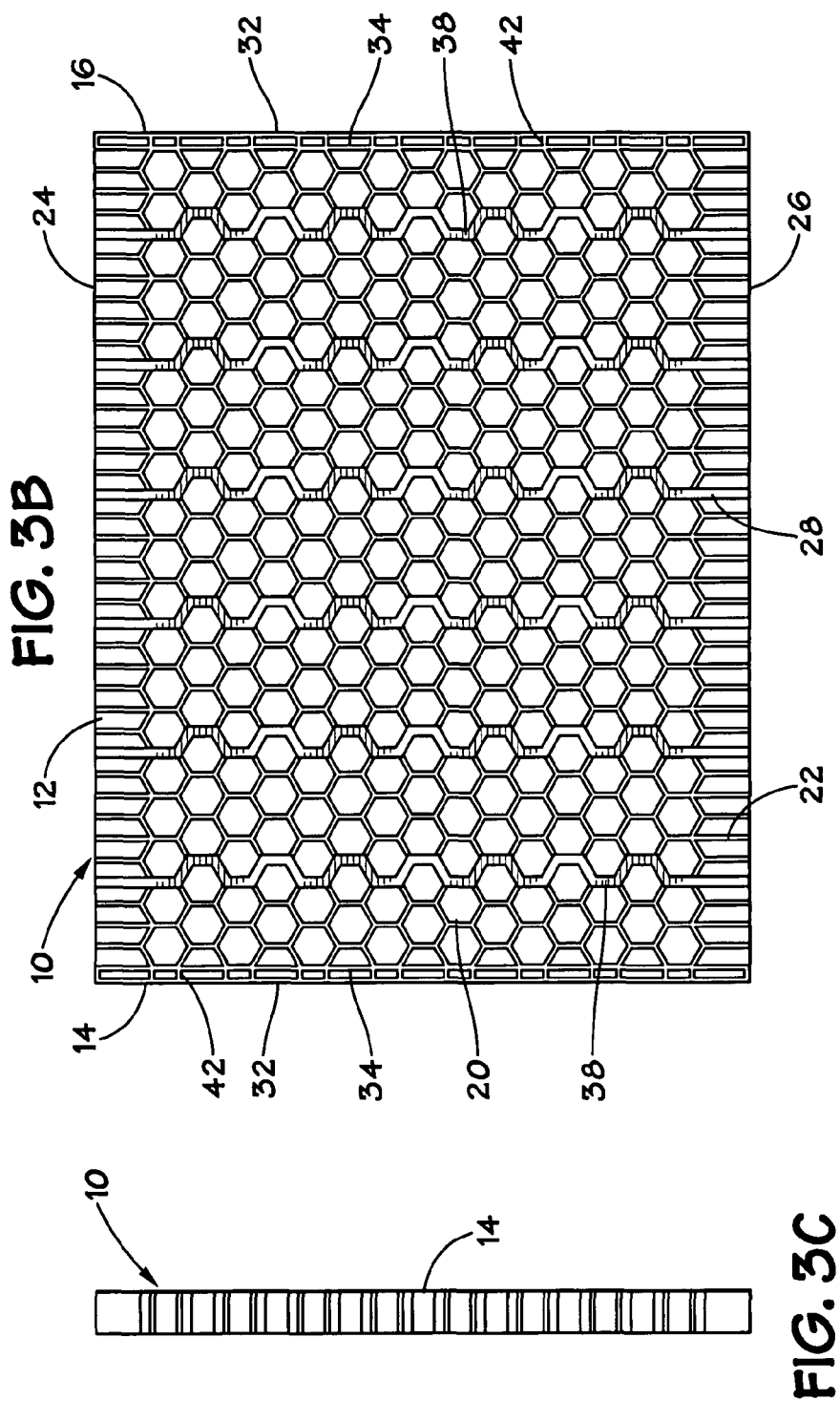

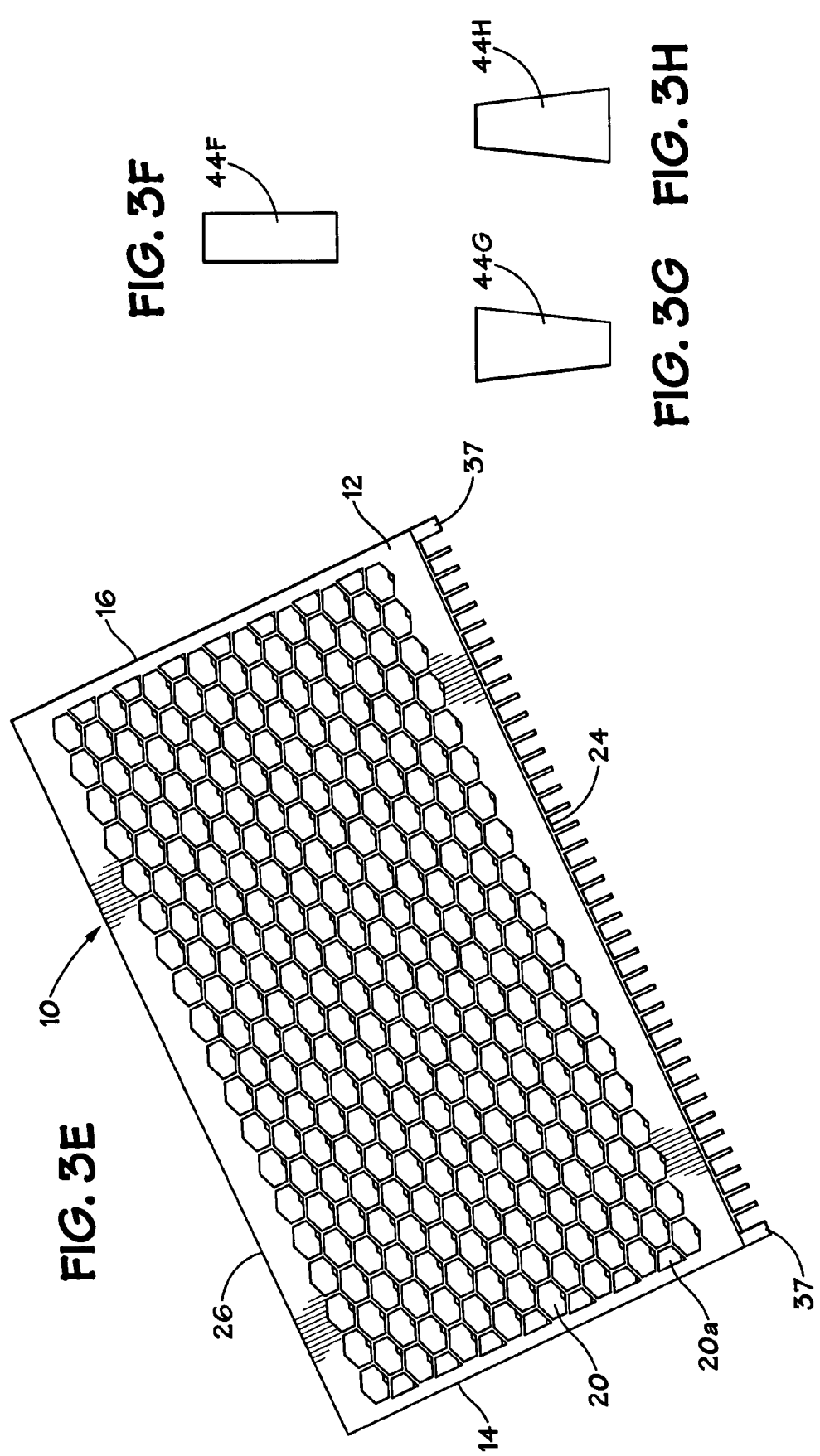

FIG. 5A
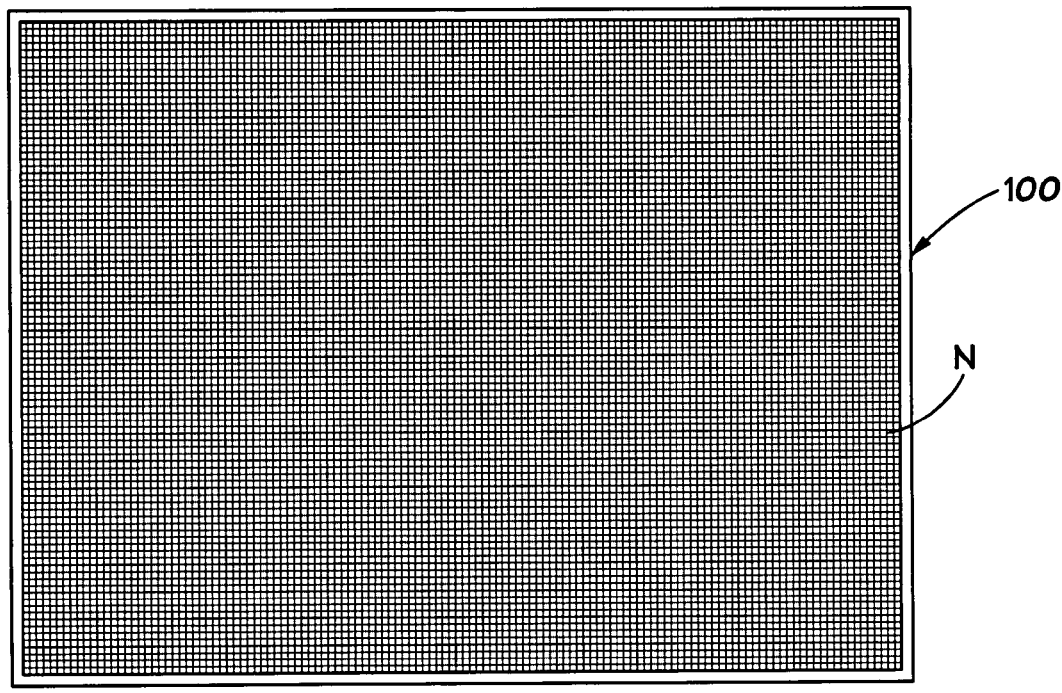
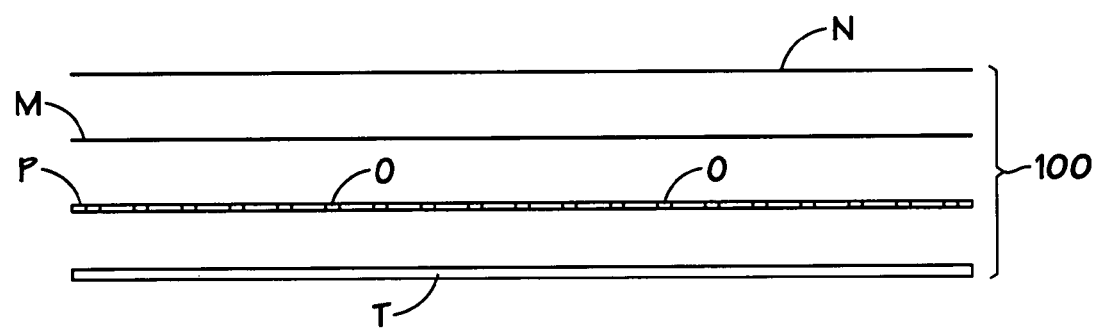
FIG. 5B

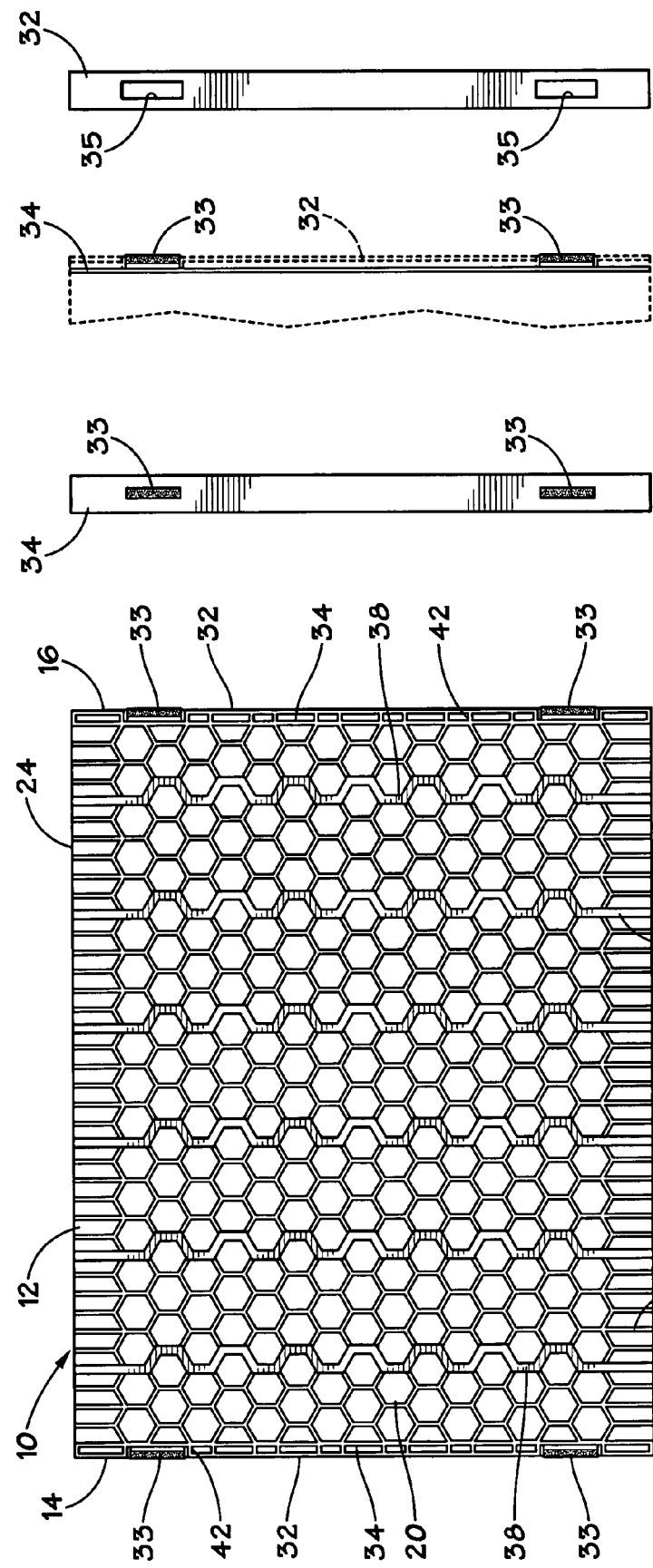

SCREEN ASSEMBLIES AND VIBRATORY SEPARATORS

BACKGROUND OF THE INVENTION

1. Field of the Invention

This invention is directed to vibratory separators; to screen assemblies for them; and, in certain particular aspects, to shale shakers and to screen assemblies for shale shakers.

2. Description of Related Art

Many typical vibratory separators and shale shakers have a container, carrier, housing, or basket to which is secured one or more screens or screen assemblies used for separating components of material fed to the vibratory separator or shale shaker. Vibrating apparatus vibrates the container and the vibrations are imparted to the screen(s) or screen assemblies secured to the container; or vibrating apparatus vibrates the screen(s) directly. Typically it is desirable to maximize vibration of the screen(s) while isolating equipment, objects, and structures adjacent the vibratory separator from the intense vibrations produced by the vibrating apparatus.

Often shale shakers are used offshore on rigs over salt water. Both the salt environment and the chemicals in drilling fluids processed by the shale shakers can contribute to the deterioration of screen assemblies.

There has long been a need, recognized by the present inventors, for a screen assembly for a vibratory separator and shale shaker which is durable; resistant to harsh environments and chemicals; provides effective screening over a temperature operation range; and is relatively light weight and easy to handle.

BRIEF SUMMARY OF THE INVENTION

The present invention, in certain embodiments, provides a screen assembly for a vibratory separator or shale shaker in which a frame, panel or support for screening material of the screen assembly is made of composite material. "Composite Material" means a plastic or resin material with reinforcing material (e.g. fibers, fibrils, pieces, strands, and/or powder) which is of a material of desired strength (e.g., but not limited to, carbon, fiberglass, plastic, metal, or mineral glass).

In certain particular aspects such a frame, panel or support is made of such a composite material with an effective stiffness which is maintained over a particular temperature range.

Separators and shakers according to certain aspects of the present invention with a screen assembly or assemblies according to the present invention are useful for treating drilling fluid with drilled cuttings, debris, etc. therein. In one particular aspect such a screen assembly or assemblies are effective over a temperature range from ambient temperature to about 90° C.

Accordingly, the present invention includes features and advantages which are believed to enable it to improve vibratory separator technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide new, useful, unique, efficient, nonobvious screen assemblies for vibratory separators and shale shakers in which parts of the screen assemblies which support screening material are made of composite material; and methods for using such screen assemblies.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the problems and needs in this area and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later attempt to disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. This drawings illustrate certain preferred embodiments and are not to be used to improperly limit the scope of the invention which may have other equally effective or legally equivalent embodiments.

FIG. 3B is a bottom view of the support of FIG. 3A.

FIG. 3C is an end view of the support of FIG. 3A.

FIG. 3D is a side view of the support of FIG. 3A.

FIG. 3E is a top perspective view of the support of FIG. 3A.

FIG. 3F is a side view in cross-section of a part of a screen assembly according to the present invention.

FIG. 3G is a side view in cross-section of a part of a screen assembly according to the present invention.

FIG. 3H is a side view in cross-section of a part of a screen assembly according to the present invention.

FIG. 5A is a top view of a screen assembly according to the present invention.

FIG. 5B is a side exploded view of the screen assembly of FIG. 5A.

FIG. 10 is a top view of opening shapes for a support according to the present invention.

FIG. 11A is a bottom perspective view of a support according to the present invention for a screen assembly according to the present invention.

FIG. 11B is an end view of an end member of the screen of FIG. 11A.

FIG. 11C is a top view of the end member of FIG. 11B.

FIG. 11D is an end view of an end member of the screen of FIG. 11A.

Figure 1A:
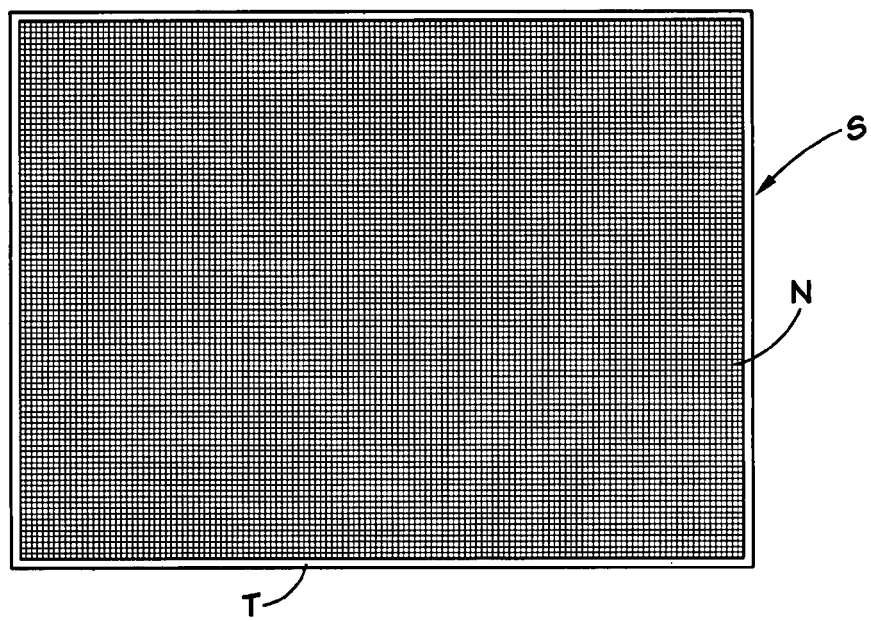
FIG. 1A is a top view of a screen assembly according to the present invention.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference.

DETAILED DESCRIPTION OF THE INVENTION

Figure 1B:
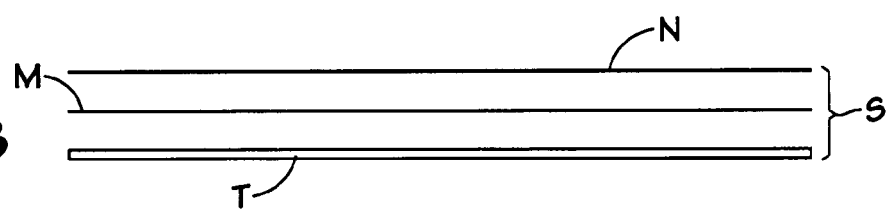
FIG. 1B is a side exploded view of the screen assembly of FIG. 1A.

FIGS. 1A and 1B show a screen assembly S according to the present invention which has a screen support T to which are secured two layers of screening material M and N. The screen support T may be any screen material support according to the present invention.

Any two known layers of screening material—flat or 3D—may be used for the layers M, N; and either layer may be deleted. Optionally, a third and/or a fourth layer of screening material (any known) may be used. Any layers may be connected together and/or connected to the screen support T in any known way.

Figure 4:
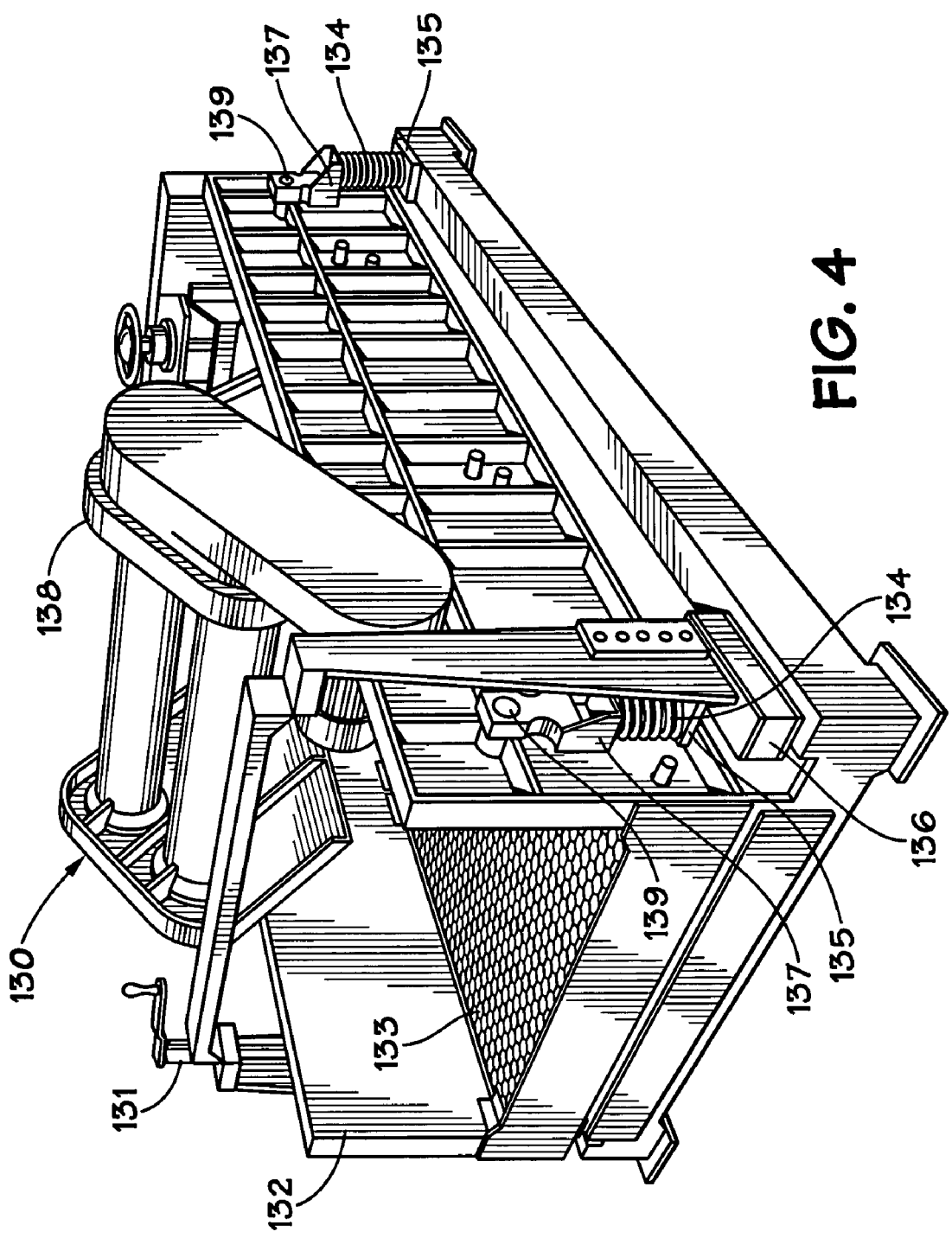
FIG. 4 is a perspective view of a shale shaker with a screen assembly according to the present invention.

FIG. 4 shows a shale shaker 130 according to the present invention which has screen apparatus 133 (any according to the present invention) mounted in a basket 132. Between basket mount members 137 and mount members 135 on a frame 136 are mounted springs 134 for isolating vibration of the shale shaker 130. Vibrating apparatus 138 vibrates the basket 132 to vibrate the screen apparatus 133. Elevator apparatus 131 provides for raising and lowering of the basket end. Posts 139 secured to the basket 132 extend through corresponding holes in the mount members 137. The screen apparatus 133 may be used with any suitable known shaker or vibratory separator.

One specific composite material useful for a frame, panel or support according to the present invention is, by weight 35% to 40% NYLON 66™ material or 6,6 NYLON™ material and 60% to 65% glass reinforcing material (or 60% to 65% glass reinforcing material plus minerals, e.g., quartz. In another aspect, instead of NYLON 66™ material, polyphenylene sulphide is used with carbon fibers. Openings in a frame, etc., according to the present invention may be any desired shape, e.g., but not limited to square, rectangular, trapezoidal, hexagonal, triangular, or diamond.

Figure 2:
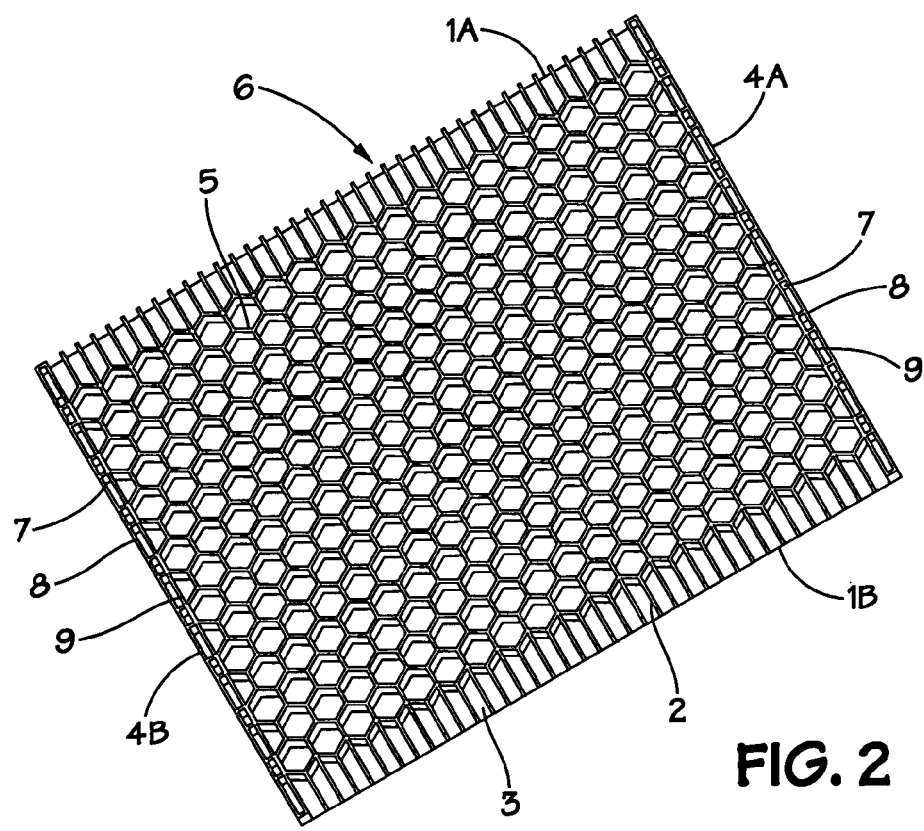
FIG. 2 is a bottom perspective view of a screen support for a screen assembly according to the present invention.

FIG. 2 shows a screen support 6 made of plastic or of composite material according to the present invention which has a plurality of fluid flow openings 5 through a body 3. Bars 2 extend to edges 1A, 1B of the body 3. Ends 4A, 4B of the body 3 each have spaced-apart members 8, 9 which extends from one side of the body 3 to the other. Ribs 7 extend between and are connected to the members 8, 9.

According to the present invention the ribs 7 may be of any desired number and may be spaced-apart any desired distance along the length of the members 8, 9. In one aspect, as shown, each rib 7 abuts a vertex of one of the openings 5, as does each bar 2, with every other bar 2 being shorter than adjacent bars 2. With the members 8, 9 the ends are strengthened. Fasteners and/or fastener material may be connected to the members 8 to connect two screen supports 6 together.

FIGS. 3A-3E show a screen support 10 according to the present invention (which may be used as the screen support for a screen assembly according to the present invention as in FIG. 1A or FIG. 4). The screen support 10 has a body 12 with ends 14, 16 spaced-apart by sides 24, 26. The body 12 has a plurality of fluid flow openings 20 therethrough which may be any desired shape and size, but which are shown as generally hexagonal when viewed from above. Some of the openings 20a at ends of the body are half the size of the openings 20. Optional opening shapes (for the screen support 10 and for any screen support according to the present invention)—as viewed from above—are shown in FIG. 10.

Bars 22 (optional) on the sides 24, 26 strengthen the support 10, enhance stiffness and extend from the outer part of openings 20 to the edges of the sides 24, 26. Optionally certain of the bars 22 have a base 28. Any bar 22 may have a base 28; or any set of bars smaller than the set of all the bars; or every other bar or every third bar.

Each end 14, 16 of the body 12 has two members 32, 34 spaced-apart by optional ribs 42. The end portions of the members 32, 34 may have an opening therebetween or as shown may be closed off with members 37.

As shown in FIG. 3C, optionally parts of certain of pieces defining the openings 20 have a base 38 and, with the bases 28, a continuous base piece is formed which extends across the width of the screen assembly 10, strengthening it and enhancing stiffness.

It is within the scope of the present invention for the width of parts of the body 12 which define the openings 20 to be uniform from top to bottom (as shown by part 44F in FIG. 3F); wider at the top than the bottom (see part 44G, FIG. 3G); or, as shown by the part 44H in FIG. 3H, to be wider at the bottom than the top. In certain aspects, select openings or all openings of select areas of a screen support will have wider portions at top or bottom of openings (e.g. in one particular aspect the openings taper from top to bottom, from narrower to slightly wider, e.g. with a 0.5° taper). In certain embodiments at a point or points of fluid stream impact onto a screen assembly, or at an exit end of a screen assembly or shaker or separator, or at areas of relatively high flow, parts 44 are like part 44G, FIG. 3G, and/or each opening has one, two, or more sides with a base like the base 38.

FIGS. 5A and 5B show a screen assembly 100 (like the screen assembly S, FIGS. 1A, 1B; like letters indicate like parts). Between the layers M, N of screening material is a perforated plate P with a plurality of fluid flow openings O (e.g. any known perforated plate used in known screen assemblies). Optionally, the plate P is placed on the support T and connected and/or adhered (collectively referred to as "secured" together) thereto by any known way in which such a plate is connected and/or adhered to an item beneath the plate. In one particular aspect the plate P is placed with material to form the support T during the making of the support T.

Screen cloth or wire on a plate or support is tensioned as is done by well-known methods and processes.

FIGS. 6A-6D illustrate a method for making a screen assembly 200 according to the present invention which has a support 102 according to the present invention, a perforated plate 104, and screening material 106 secured to the perforated plate 104. The screening material 106 may be any screening material layer or layers referred to or disclosed herein.

The perforated plate 104 is placed in a mold cavity 108 of a mold 110. Then a die plate 112 is placed in the mold cavity 108 spaced apart from the perforated plate 104. Flowable composite material 114 is then introduced into the mold cavity (see FIG. 6C) onto the perforated plate 104. The composite material 114 solidifies and adheres to the perforated plate 104.

After the plate-composite combination is removed from the mold cavity 108, the screening material 106 is connected to the perforated plate 104 (e.g. by glue, epoxy, adhesive, connectors, fasteners, sewing and/or sintering).

Figure 6A:
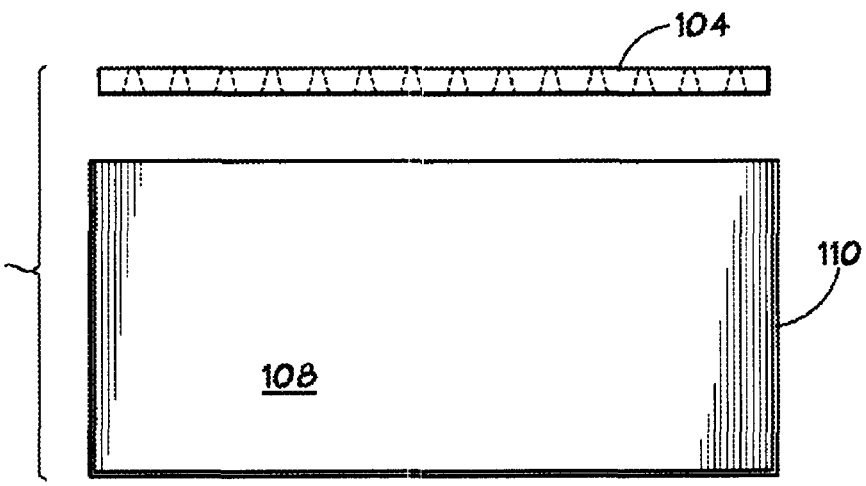
FIG. 6A is a side schematic view showing a mold and method using it to make part of a screen assembly according to the present invention.
Figure 6B:
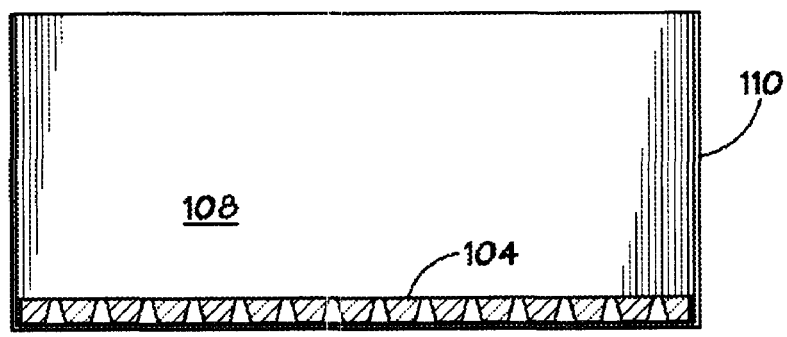
FIG. 6B shows steps in the use of the mold of FIG. 6A.
Figure 6C:
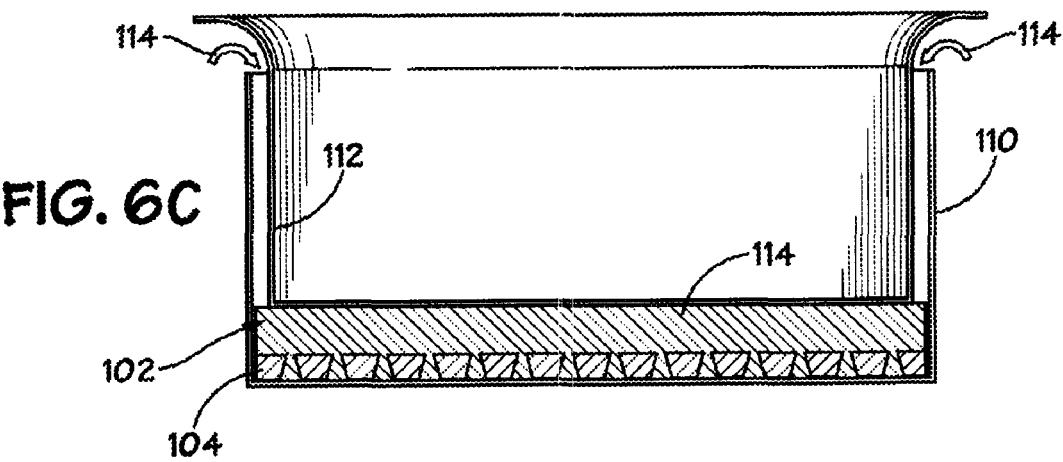
FIG. 6C shows steps in the use of the mold of FIG. 6A.
Figure 6D:
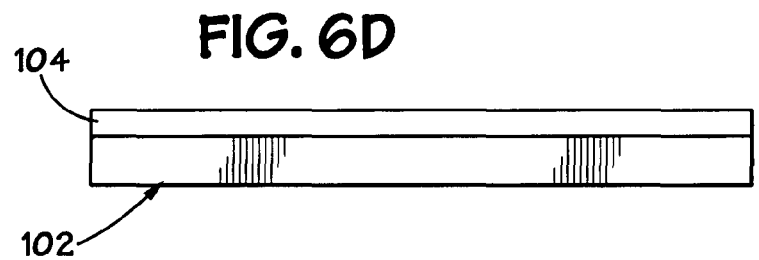
FIG. 6D is a cross-section view of a system assembly according to the present invention made with the system of FIG. 6C.
Figure 6E:
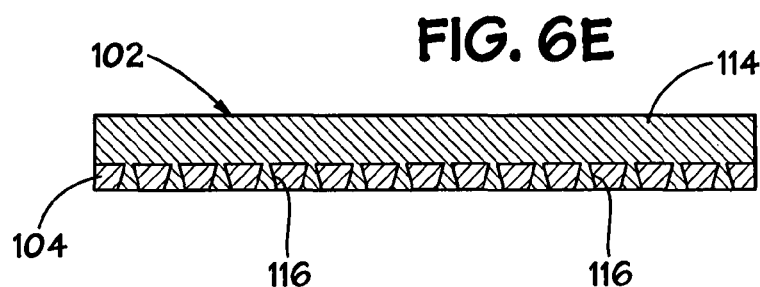
FIG. 6E is a cross-section view of a system assembly according to the present invention made with the system of FIG. 6C.

Optionally, as shown in FIG. 6E, openings 116 (of any desired shape, size, number and configuration) may be provided in the perforated plate into which composite material 114 flows and then in which the material 114 solidifies to secure the composite material 114 to the perforated plate 104. Any size or shape openings may be used through the perforated plate 104 and through the support 102.

Figure 7:
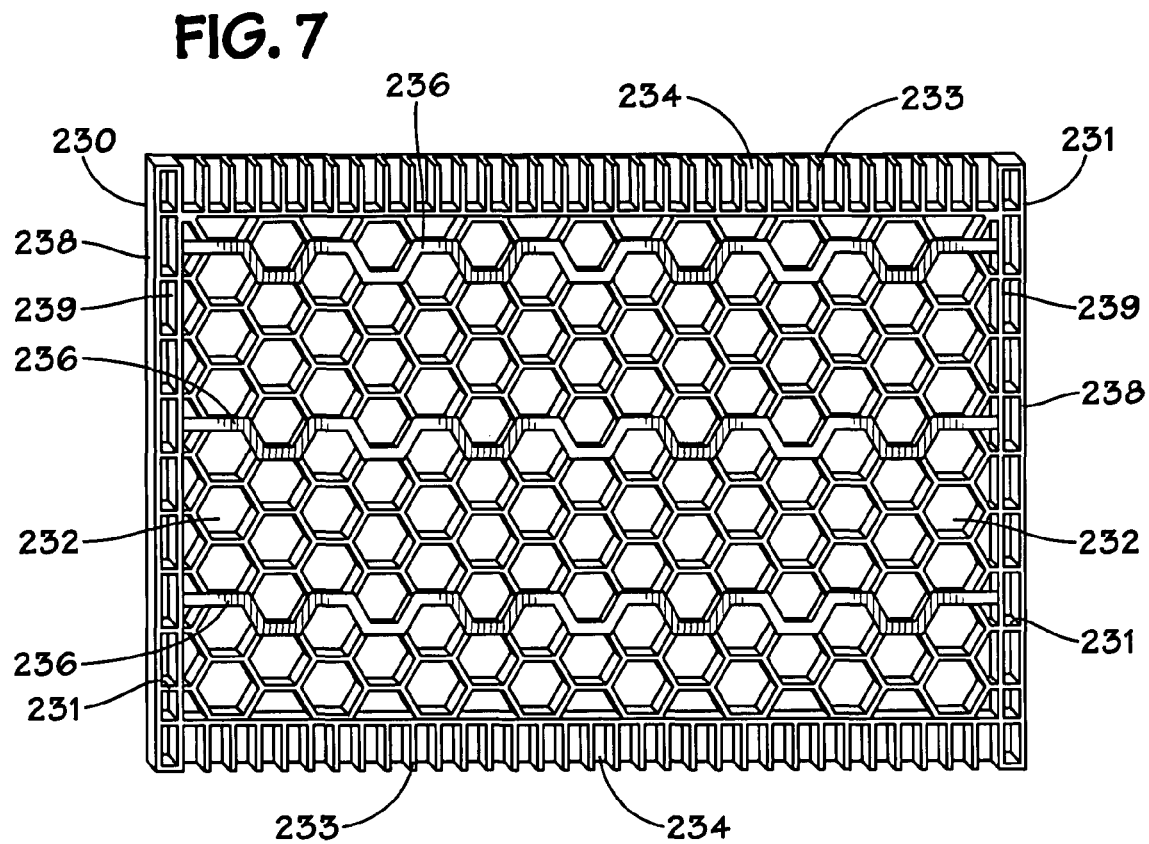
FIG. 7 is a bottom view of a screen support according to the present invention.

FIG. 7 shows a support 230 according to the present invention which has end members 238, 239 (like the members 8, 9). The end member 239 abuts vertices of hex-shaped openings 232 rather than flat sides of such openings. Base members 236 (like the bases 28, 38) extend from one end of the support 230 to the other. Bars 233 (like the bars 2) are below a body 234 (like the body 3). Ribs 231 are between the members 238, 239.

Figure 8:
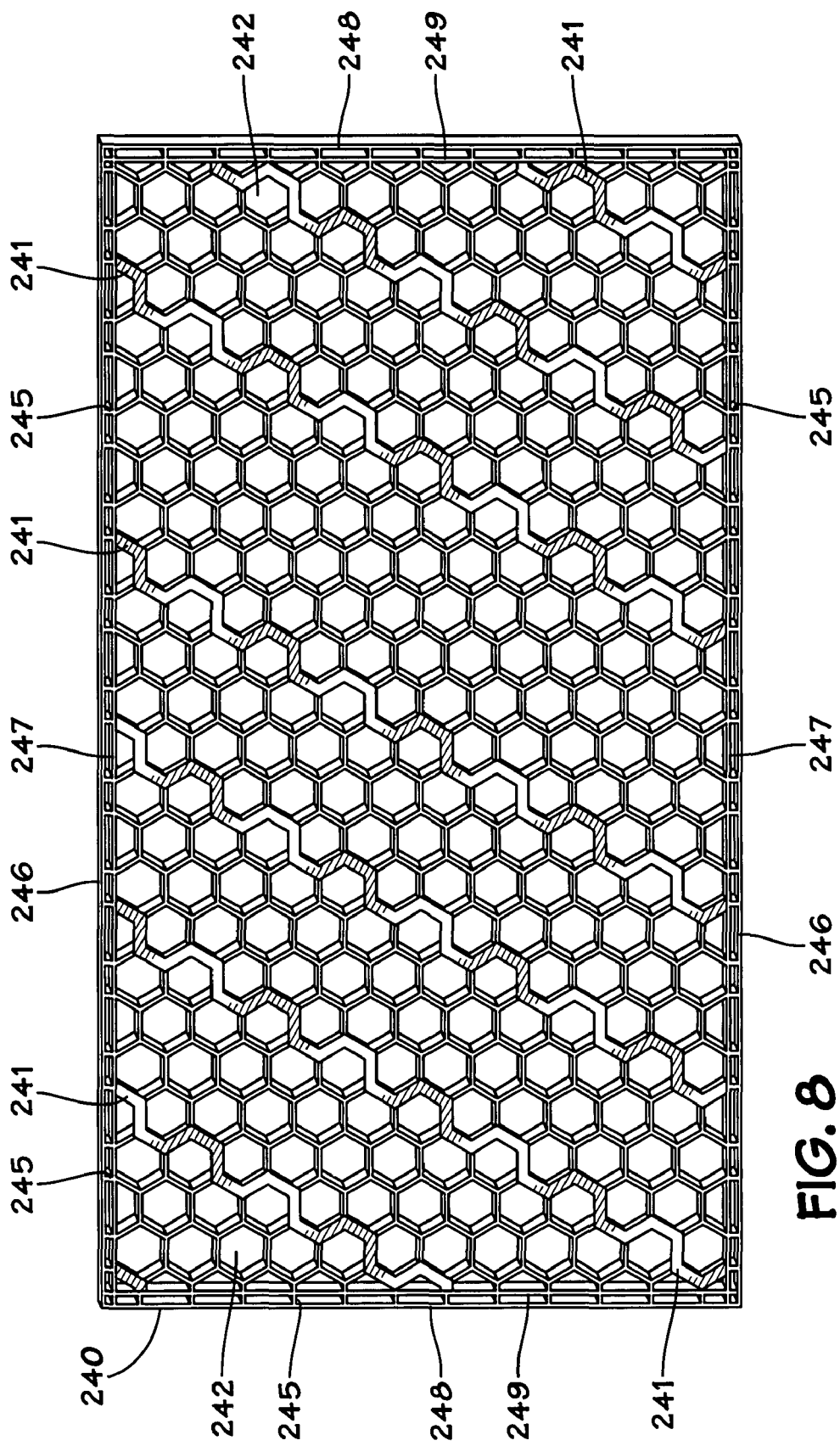
FIG. 8 is a bottom view of a screen support according to the present invention.

FIG. 8 shows a support 240 according to the present invention with openings 242 like other supports disclosed herein, but with bases 241 extending at an angle across the support, as viewed from above (any desired angle) and with side members 246, 247 like end members 248, 249 (like end members 238, 239). Ribs 245 are between the members 244, 247 and 248, 249.

Figure 3A:
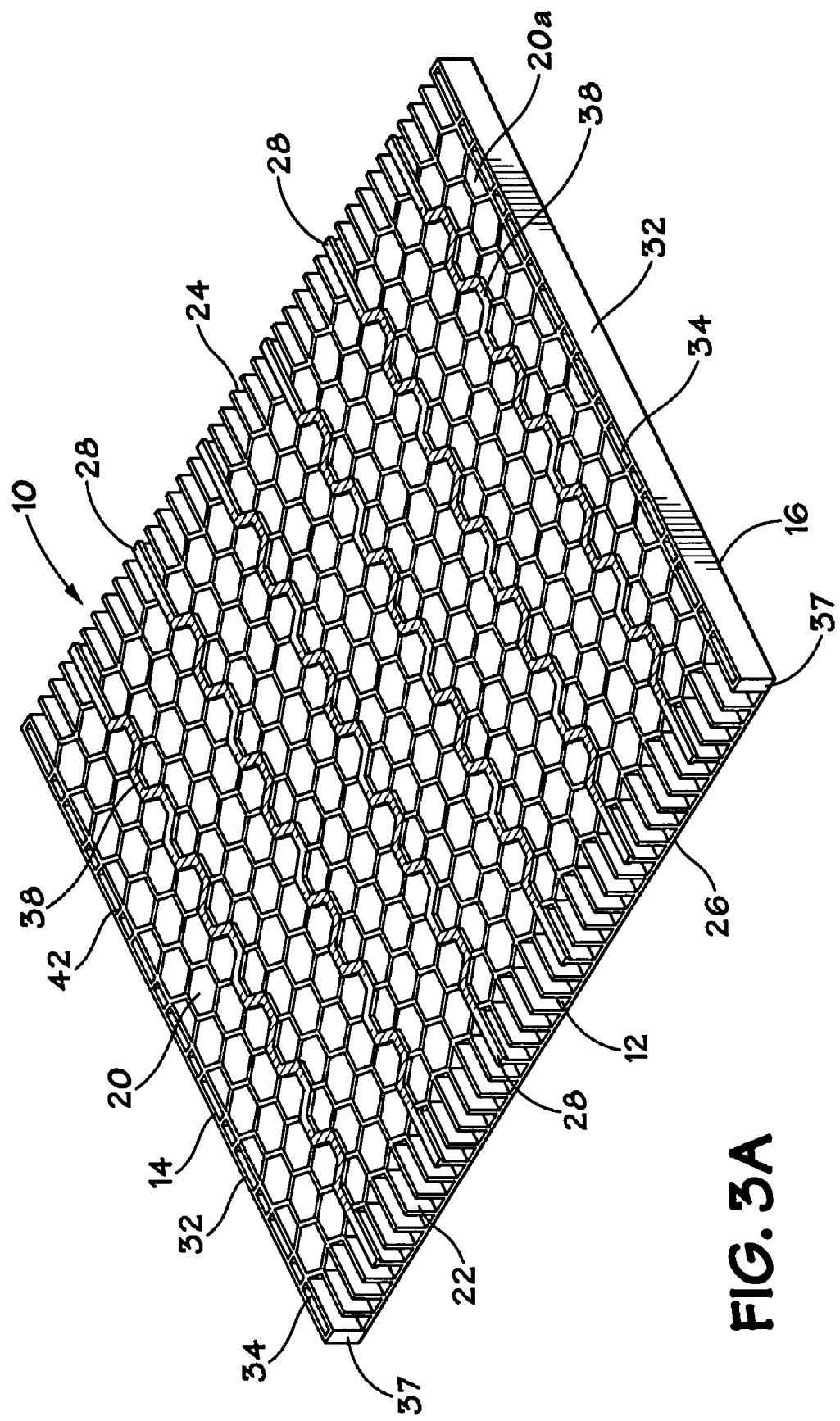
FIG. 3A is a bottom perspective view of a support according to the present invention for a screen assembly according to the present invention.
Figure 9:
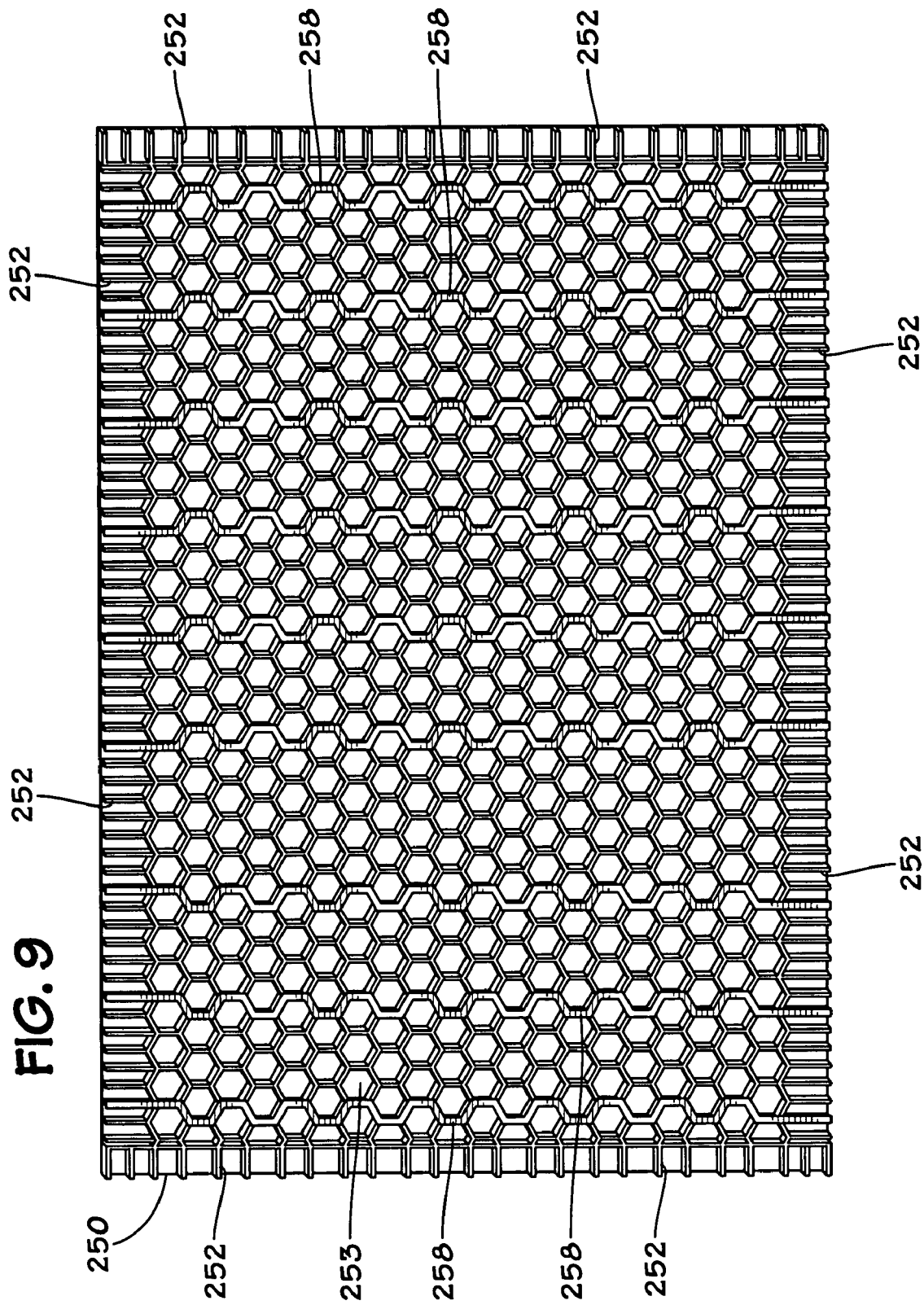
FIG. 9 is a bottom view of a screen support according to the present invention.

FIG. 9 shows a support 250, like the support of FIG. 3A, but with no end members (like the end members 32, 34) and with a series of spaced-apart bars 252 (like the bars 2 or 22) around the supports entire lower periphery. Optionally, bases 258 extend from one side to the other of the support 250 adjacent openings 253.

FIG. 11A shows an alternative version of a screen 10 as shown in FIG. 3B. As shown in FIG. 11A, the end member 34 has amounts 33 of releasably cooperating hook-and-loop fastener material secured thereto. Part of these amounts project through corresponding holes 35 in the end member 32 (see FIGS. 11B-11D). These amounts 33 of the releasably cooperating hook-and-loop fastener material are positioned for releasable mating with corresponding amounts of such material on an adjacent screen assembly or on part of a screen support or shaker basket. Such amounts of material may be used on any end member disclosed herein adjacent any end member disclosed herein with holes (like the holes 35). A sufficient amount of material 33 projects through the holes 35 so that a screen with the screen support as shown in FIG. 11A can be effectively and releasably connected to an adjacent screen assembly or to another item; and the holes 35 make it possible for two such adjacent connected screens to abut each other without the interconnected releasably cooperating hook-and-loop fastener material preventing their contact and sealing abutment. It is within the scope of this invention to use one or more than two amounts 33 (with a corresponding hole or holes).

"Composite" material as used herein includes, but is not limited to, the composite materials including resin or plastic or fiberglass or glass referred to in U.S. Pat. Nos. 6,335,101; 6,346,425; 6,352,779; 6,343,038; 6,355,206; 6,355,358; 6,361,860; 6,324,833; 6,324,833; and 6,358,603 and in the references cited in these patents—all fully incorporated here for all purposes. It is within the scope of the present invention to use for a part for a shale shaker (parts listed or mentioned above according to the present invention) a composite material with reinforcing wires, bars, cables, pieces, plates, rods and/or discs which are metal, wood or plastic and with and/or within a matrix of cement, fiberglass, and/or plastic, including, but not limited to, as disclosed in U.S. Pat. No. 6,358,603 and in the references referred to in this patent, all of which are incorporated fully herein for all purposes.

Any support according to the present invention with openings larger at a top of the support than at the bottom of the support and/or with structure defining the openings which taper from top to bottom (narrower to wider, or wider to narrower) and/or with a base member or base members across the support may be made of plastic, metal (e.g. aluminum, aluminum alloy, steel, stainless steel), resin, fiberglass, and/or a combination of these materials.

The present invention in at least, but not necessarily all, embodiments, therefore, provides a screen assembly for a vibratory separator or a shale shaker with a screen support made of composite material.

The present invention, therefore, in at least certain, but not necessarily all, embodiments, provides a screen assembly for use in a vibratory separator or shale shaker in which the screen assembly is subjected to vibratory forces sufficient to facilitate the separation of materials introduced onto the screen assembly, the screen assembly including: a support, the support made of composite material; the support having a top and a bottom and a plurality of holes therethrough from top to bottom through which material is passable, the holes defined by structure of the support, the structure defining said holes having a top and a bottom and tapering from the top to the bottom of the support and narrower at the top than at the bottom of the support or narrower at the bottom than at the top of the support; and at least one layer of screening material on the support. Such a screen assembly may have one or some, in any possible combination, of the following: the support having two spaced-apart sides, and each side of the two spaced-apart sides having a series of spaced-apart ribs; wherein each hole of the plurality of holes having a vertex pointing toward a side of the support, and wherein a rib of the series of spaced-apart ribs contacts each vertex; at least one base member at a bottom of the structure defining the holes, said base member wider than the bottom of the structure defining the holes; wherein the at least one base member is a plurality of base members spaced-apart across the bottom of the support; wherein the support has two spaced-apart sides, and each side of the two spaced-apart sides has a series of spaced-apart ribs, and wherein the at least one base member extends under a rib on each side of the support, the base member wider than the rib; wherein the support has two spaced-apart ends, and the base members are parallel to the two spaced-apart ends; the support has two spaced-apart ends, and each of said ends comprising two spaced-apart connected-together end members; wherein the at least one layer of screening material is connected to the support; wherein the at least one layer of screening material is a plurality of layers of screening material; a perforated plate on the support, and the at least one layer of screening material on the perforated plate; wherein the perforated plate is adhered to the support; wherein the at least one layer of screening material is connected to the perforated plate; and/or wherein the perforated plate is made of composite material.

The present invention, therefore, in at least certain, but not necessarily all, embodiments, provides a screen assembly for use in a vibratory separator or shale shaker in which the screen assembly is subjected to vibratory forces sufficient to facilitate the separation of materials introduced onto the screen assembly, the screen assembly including: a support, the support made of composite material; the support having a top and a bottom and a plurality of holes therethrough from top to bottom through which material is passable, the holes defined by structure of the support, the structure defining said holes having a top and a bottom and tapering from the top to the bottom of the support and narrower at the top than at the bottom of the support, or narrower at the bottom than at the top; at least one layer of screening material on the support; the support having two spaced-apart sides; each side of the two spaced-apart sides having a series of spaced-apart ribs; at least one base member at a bottom of the structure defining the holes, said base member wider than the bottom of the structure defining the holes; wherein the at least one base member is a plurality of base members spaced-apart across the bottom of the support; wherein the support has two spaced-apart sides, and each side of the two spaced-apart sides has a series of spaced-apart ribs, and wherein the at least one base member extends under a rib on each side of the support, the base member wider than the rib; a perforated plate on the support; and the at least one layer of screening material on the perforated plate.

The present invention, therefore, in at least certain, but not necessarily all, embodiments, provides a screen assembly for use in a vibratory separator or shale shaker in which the screen assembly is subjected to vibratory forces sufficient to facilitate the separation of materials introduced onto the screen assembly, the screen assembly including: a support, the support made of composite material; the support having a top and a bottom and a plurality of holes therethrough from top to bottom through which material is passable, the holes defined by structure of the support, the structure defining said holes having a top and a bottom and tapering from the top to the bottom of the support and narrower at the top than at the bottom of the support; at least one layer of screening material on the support; and at least one base member at a bottom of the structure defining the holes, said base member wider than the bottom of the structure defining the holes.

The present invention, therefore, provides in at least certain embodiments, methods for treating material with a vibratory separator or shale shaker, the methods including introducing fluid to be treated to the vibratory separator, the vibratory separator having a base, a basket, at least one screen assembly connected to the basket, vibration apparatus for vibrating the basket and the at least one screen assembly wherein said at least one screen assembly is a screen assembly according to the present invention, and processing said fluid with the vibratory separator; and, in certain aspects, wherein said fluid includes drilling fluid and drilled cuttings and said vibratory separator is a shale shaker.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in § 103. This specification and the claims that follow are in accordance with all of the requirements of 35

U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications referred to herein are incorporated fully herein for all purposes.

What is claimed is:

1. A screen assembly, comprising:
   a screen support comprising screen support members and having a top surface, a bottom surface, and a plurality of tapered flow openings defined in said screen support by said screen support members, wherein each of said plurality of tapered flow openings has sides that are convergently tapered at a substantially constant angle in a direction of intended flow, said direction of intended flow being in a direction from said top surface to said bottom surface; and
   at least one layer of screening material positioned above said top surface of said screen support.

2. The screen assembly of claim 1, wherein each of said plurality of tapered flow openings comprises an entrance opening at said top surface and an exit opening at said bottom surface, wherein a size of said exit opening is smaller than a size of said entrance opening.

3. The screen assembly of claim 1, wherein said screen support comprises a composite material.

4. The screen assembly of claim 1, wherein an included angle of each of said plurality of tapered flow openings is approximately 0.5°.

5. The screen assembly of claim 1, wherein said screen support members comprise tapered members having a first width at said top surface and a second width wider than said first width at said bottom surface.

6. The screen assembly of claim 1, wherein said screen support comprises two spaced-apart sides, each of said two spaced-apart sides comprising a plurality of spaced-apart ribs.

7. The screen assembly of claim 6, wherein a shape of each of said plurality of tapered flow openings comprises a generally polygonal shape having a plurality of sides, said generally polygonal shape comprises at least one vertex oriented substantially toward at least one of said two spaced-apart sides, and at least one of said spaced-apart ribs abuts said at least one vertex.

8. The screen assembly of claim 7, wherein said generally polygonal shape is one of a triangle, diamond, square, rectangle, trapezoid, and hexagon.

9. The screen assembly of claim 1, wherein said screen support comprises at least one base member at said bottom surface, wherein a width of said at least one base member is wider than a width of said screen support members at said bottom surface.

10. The screen assembly of claim 9, wherein said at least one base member comprises a plurality of base members.

11. The screen assembly of claim 10, wherein said screen support comprises two spaced-apart ends, and said plurality of base members are substantially parallel to said two spaced-apart ends.

12. The screen assembly of claim 9, wherein said screen support comprises two spaced-apart sides, each of said two spaced-apart sides comprises a plurality of spaced-apart ribs, said at least one base member extends under at least one of said plurality of spaced-apart ribs at each of said two spaced-apart sides, and said base member is wider than said rib.

13. The screen assembly of claim 1, wherein said screen support comprises two spaced-apart ends, each of said two spaced-apart ends comprises a first end member connected to a second end member, and said second end member is spaced apart from and substantially parallel to said first end member.

14. The screen assembly of claim 13, wherein said first end member comprises at least one amount of a releasably cooperating fastener material attached thereto, said second end member comprises at least one alignment hole corresponding in position to said at least one amount of releasably cooperating fastener material, and at least a first portion of said at least one amount of releasably cooperating fastener material projects through said at least one alignment hole.

15. The screen assembly of claim 1, wherein said at least one layer of screening material comprises a plurality of layers of screening material.

16. The screen assembly of claim 1, wherein said screen support comprises a perforated plate, and said at least one layer of screening material is positioned above said perforated plate.

17. The screen assembly of claim 16, wherein said perforated plate comprises a composite material.

18. A screen assembly, comprising:
   a screen support comprising screen support members and having a top surface, a bottom surface, and a plurality of tapered flow openings defined in said screen support by said screen support members, wherein each of said plurality of tapered flow openings has sides that are convergently tapered at a substantially constant angle in a direction of intended flow, said direction of intended flow being in a direction from said top surface to said bottom surface, said screen support further comprising:
      a perforated plate positioned at said top surface of said screen support;
      two spaced-apart sides, each of said two spaced-apart sides comprising a plurality of spaced-apart ribs;
      a plurality of base members at said bottom surface, each of said plurality of base members extending under at least one of said plurality of spaced-apart ribs at each of said two spaced-apart sides, wherein a width of each of said plurality of base members is wider than a width of said screen support members at said bottom surface and wider than said rib;
   at least one layer of screening material positioned above said perforated plate.

19. The screen assembly of claim 18, wherein said screen support comprises a composite material.

20. A screen assembly, comprising:
   a screen support comprising screen support members and having a top surface, a bottom surface, and a plurality of tapered flow openings defined in said screen support by said screen support members, wherein each of said plurality of tapered flow openings has sides that are convergently tapered at a substantially constant angle in a direction of intended flow, said direction of intended flow being in a direction from said top surface to said bottom surface, said screen support further comprising:
      two spaced-apart sides, each of said two spaced-apart sides comprising a plurality of spaced-apart ribs, wherein each of said plurality of tapered flow openings comprises a polygonal shape having a plurality of sides, said polygonal shape comprises at least one vertex oriented substantially toward at least one of said two spaced-apart sides, and at least one of said spaced-apart ribs abuts said at least one vertex;
      at least one base member at said bottom surface, said at least one base member extending under at least one of said plurality of spaced-apart ribs at each of said two spaced-apart sides, wherein a width of said at least one base member is wider than said a width of said screen support members at said bottom surface and wider than said rib;

at least one layer of screening material positioned above said support screen.

21. The screen assembly of claim 20, wherein said screen support comprises a composite material.

22. A screen assembly, comprising:

a screen support comprising screen support members and having a top surface, a bottom surface, and a plurality of flow openings defined in said screen support by said screen support members, wherein each of said plurality of flow openings has sides that are tapered at a substantially constant angle and comprises an entrance opening at said top surface having a first size and an exit opening at said bottom surface having a second size that is smaller than said first size, and a direction of intended flow through said screen support is in a direction from said entrance opening to said exit opening; and at least one layer of screening material positioned above said top surface of said screen support.

23. The screen assembly of claim 22, wherein said screen support comprises a composite material.

24. A screen assembly, comprising:

a screen support comprising screen support members and having a top surface, a bottom surface, and a plurality of tapered flow openings defined in said screen support by said screen support members, wherein each of said plurality of tapered flow openings has sides that are tapered at a substantially constant angle in a direction of intended flow, wherein said direction of intended flow is in a direction from said top surface to said bottom surface, and wherein an included angle of each of said plurality of tapered flow openings is approximately 0.5° ; and at least one layer of screening material positioned above said top surface of said screen support.

* * * * *